Oct. 21, 1958 C. J. CRETORS ET AL 2,856,841
POPCORN MACHINES
Filed Aug. 7, 1953 2 Sheets-Sheet 1
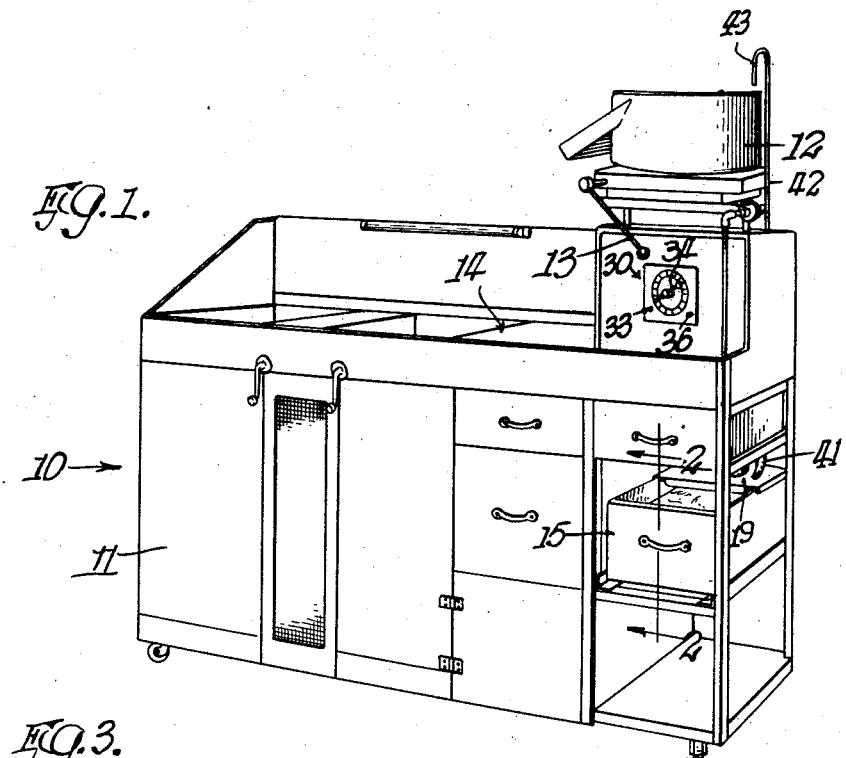
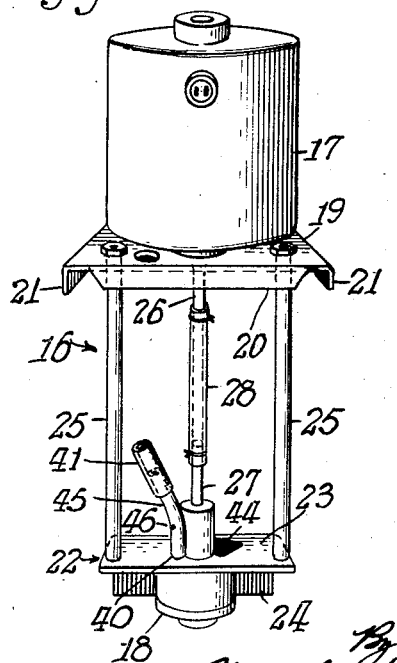
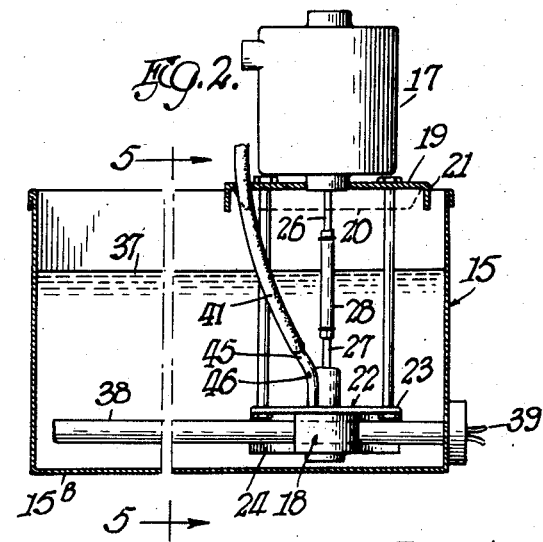
Inventors.
Charles J. Cretors &
Norman E. Carlson Oct. 21, 1958  C. J. CRETORS ET AL  2,856,841
POPCORN MACHINES
Filed Aug. 7, 1953  2 Sheets-Sheet 2

Inventors.
Charles J. Cretors &
Norman E. Carlson

United States Patent Office 2,856,841
Patented Oct. 21, 1958

2,856,841

POPCORN MACHINES

Charles J. Cretors, Highland Park, and Norman E. Carlson, Itasca, Ill., assignors to C. Cretors & Co., Chicago, Ill., a corporation of Illinois Application August 7, 1953, Serial No. 372,826

3 Claims. (Cl. 99—238)

This invention relates to improvements in popcorn machines, of which the following is a specification:

The invention relates generally to machines for popping popcorn, but relates more particularly to means for supplying so-called seasoning or corn popping oil to the popping kettle or pan of commercial type corn popping machines.

Certain features of the invention also relate to means for supplying different amounts of corn popping or seasoning oil to popping pans or kettles as required properly to pop batches of corn of different amounts.

As a typical illustration of so-called commercial type popcorn machines reference may be made to popcorn machines such as are commonly used at places of amusement. At such places the demand for popcorn seasoning may vary widely, dependent upon the taste of patrons who may patronize the event and who desire to purchase popcorn.

The corn is popped in what is known as a popping kettle or pan and it is the common practice to supply a quantity of oil, usually termed "seasoning" to the popping kettle, the amount of oil being generally in proportion to the quantity of corn which is to be popped in that particular batch. While the oil is termed a seasoning oil, it really performs a dual function. That is to say the oil used does give some seasoning to the corn, but it also serves a useful function in assisting properly to pop the corn.

Heretofore various means have been devised aimed at supplying different amounts of oil to popping pans or kettles. However, such mechanisms have usually comprised cylinders, pistons, check valves, and other mechanisms which result in a very complicated arrangement.

In other proposed designs a surplus of oil is supplied to the popping kettle or pan, which makes necessary the return of the surplus to the reservoir. This complicates the design by requiring both feed and return lines and returning to the reservoir oil which has once been deposited in the popping pan or kettle, which is undesirable.

In the commercial popping of corn various types of oil or seasoning are used, such for example as coconut oil, soybean oil, etc., which congeal at different temperatures, which fact complicates the matter of supplying desired measured quantities of oil to the popping kettle or pan.

The general object of the invention is to provide improved and simplified means of supplying a predetermined quantity of popping oil to the popping kettle, as required for the popping of a batch of predetermined size.

Another object of the invention is to provide improved and simplified means for supplying definite measured quantities of popping oil to popping kettles of varying capacities as may be required to pop varying amounts of popping corn, or to vary the flavor in a popping pan of a given size.

Another object of the invention is to provide an arrangement in which that oil which remains in the conduit leading to the popping pan after each cycle of pump operation, and which is above the level of the oil in the storage tank, automatically returns to the storage tank, thereby avoiding oil congealing in the conduit, which sometimes occurs unless heat be applied to the conduit to maintain fluidity.

A further object of the invention is to provide means for supplying popping oil to the popping pan by simplified mechanism, in which a constant volume will be discharged into the popping pan per unit of time.

Again, it is an object of the invention to provide means whereby a pump may be used for supplying varying quantities of popping oil to the pan in such a way as to require no valves, pistons, or other complicated devices.

Another object of the invention is to provide an apparatus for supplying measured quantities of popping oil to the popping kettle, wherein the mechanism for conveying the oil from the reservoir to the popping pan may be removed and replaced as a unit, thus facilitating manufacture of the unit and also facilitating the cleaning, inspection and repair of the unit after periods of operation.

The above mentioned objects of the invention as well as others, together with the advantages thereof, will more fully appear as the specification proceeds to describe the accompanying drawings, which illustrate the preferred embodiment of the invention.

In said drawings:

Fig. 1 is a perspective view of a so-called commercial type of popcorn machine, as viewed from the side where the operator stands.

Fig. 2 is a detail view partly in section, partly in elevation, as taken on the line 2—2 of Fig. 1, but on a scale enlarged with respect thereto.

Fig. 3 is a perspective view of a motor and pump unit removed from the oil storage tank or reservoir.

Figure 4:
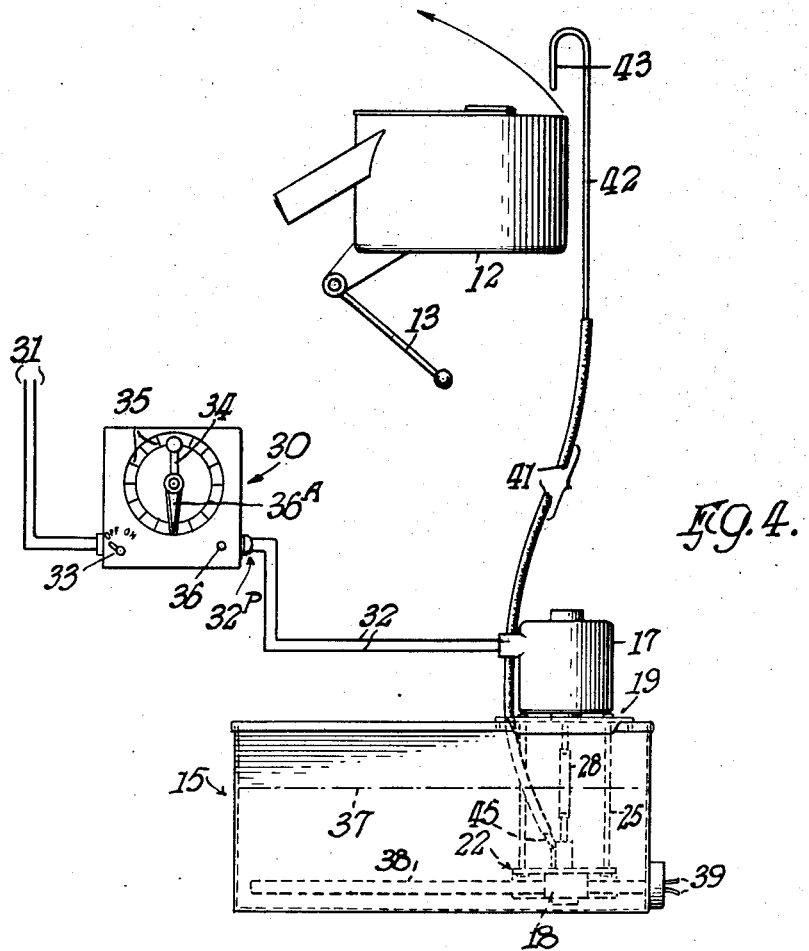
Fig. 4 is a schematic view illustrating the arrangement of the storage tank, pump, popping kettle and the timer for automatically controlling the length of time the pump operates.

Referring first particularly to Fig. 1, 10 represents a so-called commercial popcorn machine comprising a cabinet 11, which contains storage capacity for varying amounts of popped popcorn, also drawers and storage capacity for unpopped corn, popping oil, bags, containers and other items which are used in the popping of the corn and in the sale of the popped corn to the purchasers. The machine has been illustrated in order to show the general relationship of the features to which this invention relates. On the top of one end of the specific machine illustrated there is positioned a popping kettle or pan 12 into which batches of unpopped corn are placed, there being suitable means for supplying heat to the bottom of the pan. When the batch of corn has been popped, the popping pan is swung in the direction of the arrow by means of a handle 13 so as to dump the popped corn onto the cabinet area 14, the kettle again being returned to the position shown in the drawings so that another batch of corn may be popped.

As before stated, prior to the popping operation a quantity of popping oil or so-called seasoning oil has been discharged into the popping pan, the amount of oil supplied being related to the quantity of corn being popped. Both as matters of convenience and economy it is essential that the quantity of oil delivered to the popping pan be such as has been determined to be the right amount.

Figure 5:
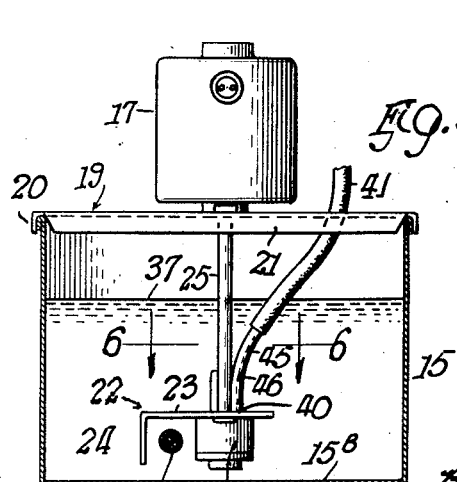
Fig. 5 is a cross sectional view on the line 5—5 of Fig. 2.
Figure 6:
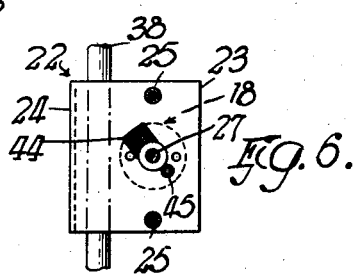
Fig. 6 is a fragmentary detail view on the line 6—6 of Fig. 5.

In order to supply desired quantities of the oil to the popping pan there is provided a storage tank 15 to hold a suitable quantity of the oil, and a pump unit assembly which as a whole bears the reference character 16—see Fig. 3. The pump unit assembly 16 comprises an electric motor 17 and a pump 18. The motor 17 is mounted upon a bridge plate 19 of a size adapted to span the oil tank 15, as best illustrated in Figs. 2 and 5. The bridge plate 19 is provided with depending flanges 20—20 which extend beyond the sides of the tank and stiffening flanges 21—21 which extend into the tank, spanning the distance between the inner walls of the tank.

The pump is attached to a plate structure, indicated as a whole by the number 22, which comprises a horizontally disposed upper plate portion 23 and a vertically disposed flange portion 24, the plate structure 22 as a whole being supported from the bridge plate 19 by means of a pair of supporting columns 25—25.

The armature 26 of the motor 17 is connected to the pump shaft 27 of the pump 18 by means of a flexible connector 28, which advantageously may be in the nature of a tube of a synthetic rubber or other elastomer, which is well adapted to withstand immersion in oil of the type used in the popping of corn.

The pump 18 is of a substantial constant volume type, such for example as the gear type pump, so that it will discharge the same amount of fluid per unit of time. By providing a constant volume pump, the discharge from the pump will supply volumes of oil which will be directly proportional to the time that the pump motor operates. In order that the time may be varied so that desired quantities of oil may be discharged into the popping pan there is provided an electric timer 30.

The electric timer 30 is supplied with power from the lines 31, which lead from a conventional 110 volt power source. Extending between the motor 17 and the timer are the power lines 32 which provide current to energize the motor 17 when the timer 30 has been set for operation.

The timer 30 is provided with an off and on switch 33 which when in "off" position entirely disconnects the timer 30 from the power source, and when in "on" position supplies current to the timer, utilizable however only when the timer hand 34 has been swung from the zero position to one of the calibration points 35 and the control button 36 has been pushed to initiate a cycle of operation.

At the end of the cycle of operation when another supply of oil is required, as when popping another batch of corn, it is but necessary again to push the control button 36 which will again initiate a cycle of operation. It is not necessary again to set the timer hand 34 unless a different quantity of oil be desired.

36$^A$ represents an indicator hand which, between periods of operation, is located wherever the timer hand 34 has been positioned. Every time the control button 36 is pushed to initiate a cycle of operation, the indicator hand 36$^A$ moves under clock action toward the zero position and on reaching zero position quickly returns under spring action to the position which the timer hand 34 occupies, being stopped there by a stop pin on hand 34.

Timers of the above type are available on the open market, one suitable timer being manufactured by the Industrial Timer Corporation of Newark, New Jersey.

The operation of the machine

It is believed that the remaining features and advantages of the construction will be understood from a description of the operation of the machine.

Assuming that a supply of seasoning or popping oil has been placed in the tank 15, as indicated in Figs. 2, 4 and 5, it will be observed that the pump part of the unit will be submerged. Since the oil 37 will more or less tend to congeal at atmospheric temperatures there is provided an electrical heating element 38 supplied from a power source by means of the wires 39 which lead to a suitable source of electric current. The heating element 38 is disposed under the plate portion 23 of the structure 22 and between the body of the pump 18 and the depending flange portion 24.

It will be noted the plate portion 24 terminates a short distance above the bottom portion 15$^B$ of the tank or reservoir 15. By the structure described, the pump is positioned within a zone which is somewhat isolated with respect to the body of oil as a whole in the reservoir. When the heating element 38 is energized heat will be imparted to the oil directly surrounding the pump and also to the plate structure 22 which, by conduction, will quickly transmit heat to the body of the pump 18. The body structures of pumps are usually made of cast iron, which tends somewhat to insulate the oil within the pump from that in the reservoir. After standing a while the oil in the pump housing tends to congeal. However, with the described arrangement oil within the pump body, as well as the surrounding oil, will be quickly brought to the desired state of fluidity so that it will flow properly to the discharge outlet 40 of the pump through the flexible tube 41 connecting with the metal tube 42 which, through the return bend section 43, discharges into the popping pan 12.

Oil is supplied to the pump through the screened pump inlet 44. In order to avoid leaving a supply of oil in the lines 41 and 42, the tube 45 leading direct from the pump discharge is provided with means for returning to the reservoir 15 the oil remaining in the conduit after a cycle of operation. In the specific device illustrated this takes the form of a small drain hole 46.

It will be understood that during the period the pump is in operation oil will also discharge through the drain hole 46 into the reservoir. However, the volume of oil so discharged will be small compared to that discharged by the pump and will be compensated for in the timer setting. As by way of illustration and not by way of limitation it has been found satisfactory to provide a hole of the size which a No. 55 drill will form, where the conduit has an inside diameter of approximately 5/16 inch and the pump discharge is approximately 1 oz. per second.

As before explained generally the storage cabinet 10 contains a supply of seasoning or popping oil. By making the connection 41 of flexible tubing it is possible to pull the oil tank 15 outwardly a sufficient distance to permit pouring the seasoning oil into the oil tank 15, as required from time to time, without the necessity of disconnecting any of the connections. The use of flexible tubing 41 also facilitates the manufacture and assembly of the parts. Should it be necessary at any time to remove the pump unit, for inspection, repair or cleaning, it is only necessary to separate the lower end of the flexible tube 41 from the tube 45 and disconnect the electric plug 32$^P$, at which time the reservoir 15 can be entirely withdrawn. The pump unit can then be lifted bodily from the reservoir. Replacement likewise is a simple operation requiring no special skill.

It will be noted that the timer is placed closely under the popping pan where it is convenient for the operator to actuate the timer to initiate the popping operation, after the various batches of corn have been popped and discharged.

As indicated in the schematic view Fig. 4, the downwardly depending end 43 of the oil supply line terminates a sufficient distance above the top of the popping pan to permit the pan to clear the bottom of the tube in its swinging movement from operating or popping position to the dumping position.

With the means disclosed that oil, which remains in the conduit after each cycle of pump operation, and which is above the level of the oil in the tank, returns to the tank. Hence there is no oil in that part of the conduit, except when the pump is in operation and it is unnecessary to apply heat to the conduit to maintain fluidity of the oil as would be the case if a column of oil remained in the conduit. At no time does any oil, which has been discharged into the popping pan, ever return to the storage tank.

The parts are simple in construction, may be rapidly assembled and those requiring cleaning from time to time may be readily removed to permit inspection, repair, cleaning, etc. The various other advantages of the structure will be understood by persons skilled in the art to which this relates, without further comment.

We claim:

1. A device for use in a popcorn machine embodying therein a corn popping pan, a reservoir for holding a quantity of popping oil, a pump positioned in the reservoir at a level which causes it to be submerged when the reservoir contains an operating supply of popping oil, plate structure in the reservoir arranged adjacent the said pump and comprising a horizontal portion contacting the pump, electronic heating means positioned in said reservoir and extending adjacent and below said plate means at least in part, said pump having an intake and an outlet, a conduit connected to the pump outlet, said conduit having an outlet end positioned to discharge at a level above the reservoir, electric motor means connected to drive said pump, and means for controlling the operating period of said motor.

2. A device for use in a popcorn machine embodying therein a corn popping pan, a reservoir for holding a quantity of popping oil, a pump positioned in the reservoir at a level which causes it to be submerged when the reservoir contains an operating supply of popping oil, plate structure in the reservoir surrounding the pump at least in part, at least a portion of the plate structure being spaced from the pump, electronic heating means positioned in said reservoir and extending, at least in part, into the space between the pump and said plate structure, said pump having an intake and an outlet, a conduit connected to the pump outlet, said conduit having an outlet end positioned to discharge at a level above the reservoir, electric motor means connected to drive said pump, and means for controlling the operating period of said motor.

3. A popcorn machine embodying therein a corn popping pan, means forming a reservoir for holding a quantity of popping oil and positioned at a level below the corn popping pan, means forming a pump unit embodying structure engaging and being removably supported on the reservoir, said pump means including a motor, a pump spaced downwardly therefrom at a level to be submerged in the popping oil of the reservoir, a drive shaft connecting the motor and pump, means attached to the pump and having a portion spaced therefrom, means depending from the said structure supported on the reservoir for supporting the means attached to the pump, and heating means positioned adjacent the pump and positioned between the pump and that portion of the means attached to the pump and which is spaced therefrom.

References Cited in the file of this patent

UNITED STATES PATENTS

| | | |
|---|---|---|
| 1,745,800 | Kramer | Feb. 4, 1930 |
| 2,022,208 | Lacke | Nov. 26, 1935 |
| 2,134,088 | Obdyke | Oct. 25, 1938 |
| 2,554,802 | Waas | May 29, 1951 |
| 2,585,440 | Collins | Feb. 12, 1952 |
| 2,665,710 | McGarry et al. | Jan. 12, 1954 |
| 2,733,841 | Waas | Feb. 7, 1956 |

FOREIGN PATENTS

| | | |
|---|---|---|
| 139,961 | Great Britain | Mar. 18, 1920 |